(12) United States Patent
Seidl

(10) Patent No.: US 7,693,632 B2
(45) Date of Patent: Apr. 6, 2010

(54) MOTORCYCLE

(75) Inventor: Josef Seidl, Dingolfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/275,818

(22) Filed: Nov. 21, 2008

(65) Prior Publication Data

US 2009/0076684 A1     Mar. 19, 2009

Related U.S. Application Data

(63) Continuation of application No. PCT/EP2007/003848, filed on May 2, 2007.

(30) Foreign Application Priority Data

May 24, 2006    (DE)  ........................ 10 2006 024 327

(51) Int. Cl.
     *B60K 21/00*     (2006.01)
     *B62D 6/00*      (2006.01)

(52) U.S. Cl. ........................ 701/41; 701/42; 180/222; 280/276; 280/279

(58) Field of Classification Search ............. 701/41–43; 180/219, 222, 223; 280/274–284
See application file for complete search history.

(56) References Cited

U.S. PATENT DOCUMENTS

| | | | | |
|---|---|---|---|---|
| 4,179,135 A | | 12/1979 | Slater | |
| 4,388,978 A | * | 6/1983 | Fior | 180/219 |
| 4,526,249 A | * | 7/1985 | Parker | 180/219 |
| 4,741,545 A | * | 5/1988 | Honma et al. | 280/92 |
| 4,744,579 A | | 5/1988 | Roatta | |
| 4,756,547 A | * | 7/1988 | Trema | 280/276 |
| 4,785,905 A | * | 11/1988 | Trema | 180/219 |

FOREIGN PATENT DOCUMENTS

| | | |
|---|---|---|
| EP | 1 426 280 A1 | 6/2004 |
| JP | 7-215258 A | 8/1995 |

OTHER PUBLICATIONS

International Search Report dated Jun. 27, 2007 w/English translation of pertinent portion (five (5) pages).
German Search Report dated Jan. 25, 2007 w/English translation of pertinent portion (nine (9) pages).
Chinese Office Action mailed Dec. 25, 2009.

* cited by examiner

*Primary Examiner*—Richard M. Camby
(74) *Attorney, Agent, or Firm*—Crowell & Moring LLP

(57) ABSTRACT

A motorcycle is provided with a fork-like wheel carrier, on the lower end of which a front wheel is supported, a handlebar by which the wheel carrier can be steered in a steering direction to the left or the right during travel, and a transmission unit by which the handlebar is coupled to the wheel carrier. The transmission unit is provided for transmitting steering forces, introduced into the handlebar, to the wheel carrier and bringing same into a corresponding steering position. The wheel carrier is mounted so as to be pivotable with respect to the handlebar, such that for a specified steering position, the wheel carrier can be moved, at least over a certain range, relative to the handlebar in the steering direction.

10 Claims, 2 Drawing Sheets

MOTORCYCLE

CROSS-REFERENCE TO RELATED APPLICATIONS

This application is a U.S. Continuation Application of International Application No. PCT/EP2007/003848, filed May 2, 2007, and claims priority under 35 U.S.C. §119 to German Patent Application No. 10 2006 024 327.7, filed May 24, 2006, the entire disclosures of which are expressly incorporated by reference herein.

BACKGROUND AND SUMMARY OF THE INVENTION

The present invention relates to a motorcycle having a front wheel carried by a wheel carrier.

Modern vehicles are frequently equipped with a so-called driving stability system, which on the basis of various driving state signals such as wheel speed, transverse acceleration, yaw rate, etc., continuously monitors the actual driving state, and when a critical driving state is recognized stabilizes the vehicle by active braking or fuel intervention. The driving stability systems known from the area of four-wheeled vehicles cannot be transferred to motorcycles. If the motorcycle is in an unstable lateral force state, it is usually not possible to stabilize the vehicle by a braking intervention.

The object of the invention is to provide a motorcycle having a chassis design such that in critical driving situations it is possible to stabilize the driving state by means of electronic control intervention.

The starting point of the invention is a motorcycle having a fork-like wheel carrier, on the lower end of which a front wheel is supported. The term "wheel carrier" is interpreted very broadly, and encompasses in particular telescopic forks, such as the "telelever design" developed by BMW, as well as fork-like wheel carriers produced in a one-piece design, for example in the form of a cast part, such as the "duolever front wheel suspensions" known in BMW motorcycles. Similarly as for conventional motorcycles, a handlebar is provided by means of which the wheel carrier can be steered in a steering direction, i.e., to the left or the right, during travel. The handlebar is coupled to the wheel carrier via a "transmission unit." The transmission unit is provided for transmitting the steering forces, introduced into the handlebar by the driver, to the wheel carrier and bringing same into a corresponding steering position.

The essence of the invention lies in the fact that the wheel carrier is mounted in such a way that it is pivotable with respect to the handlebar. In this context, "pivotable" means that for a specified steering position the wheel carrier can be pivoted, at least over a certain range, in the steering direction, i.e., to the left or the right, relative to the handlebar. This additional degree of freedom allows a steering intervention to be controlled by a driving stability system, i.e., a driving stability electronics system, during travel so that a "correction" of the steering position of the wheel carrier is made, specifically, without changing the position of the handlebar specified by the driver. Therefore, it is not necessary for the handlebar to also be moved during a steering intervention.

According to one refinement of the invention, the transmission unit has an actuator by which the wheel carrier may be pivoted with respect to the handlebar during travel. The actuator may be, for example, a hydraulic cylinder, a pneumatic cylinder, an electric motor, or some other actuator which responds quickly and precisely.

Such a steering intervention may be controlled by a monitoring electronics system which during travel of the motorcycle monitors at least one, preferably multiple, driving state variables such as wheel speed, yaw rate, lateral inclination angle, pitch angle, etc., and when a critical driving state is recognized performs a steering intervention which stabilizes the driving state by controlling the actuator.

According to one refinement of the invention, the wheel carrier has a left and a right fork arm which are joined together at the region of their upper ends by a "connecting section," or by a separate "connecting piece" which may also be referred to as an upper fork bridge. The fork arms are fixedly connected to this connecting piece, i.e., "fork bridge." The handlebar, on the other hand, is mounted so as to be pivotable with respect to the fork bridge. From a kinematic standpoint, the actuator is situated between the handlebar and the wheel carrier, which allows the wheel carrier to pivot in relation to the handlebar. The handlebar may be supported directly on the fork bridge.

As previously mentioned, the wheel carrier may be a telescopic fork having two fork rods, each having two fork tubes which may be moved one inside the other, or may be a one-piece wheel carrier, i.e., produced in the form of a cast part.

Similarly as for the BMW motorcycles currently on the market having the known "telelever front wheel suspension" and "duolever front wheel suspension," the wheel carrier may be suspended on the remainder of the motorcycle via one or two so-called "longitudinal control rods." For a telelever front wheel suspension, the two lower fork tubes of the telescopic fork are joined together via a lower fork bridge, and the lower fork bridge is connected to a lower longitudinal control rod via a ball-and-socket joint centrally located in the region between the two fork rods, the rear end of the lower longitudinal control rod being pivotably supported on the frame or on the engine housing. The ends of the upper fork tubes of the two fork rods are supported in an upper fork bridge by means of ball-and-socket joints, the upper fork bridge in turn being pivotably connected to the frame of the motorcycle.

For a duolever front wheel suspension, a one-piece wheel carrier produced in the form of a cast part is provided which is suspended in an articulated manner on the frame or on the engine housing via a lower and an upper longitudinal control rod.

Other objects, advantages and novel features of the present invention will become apparent from the following detailed description when considered in conjunction with the accompanying drawings.

DETAILED DESCRIPTION

Figure 1:
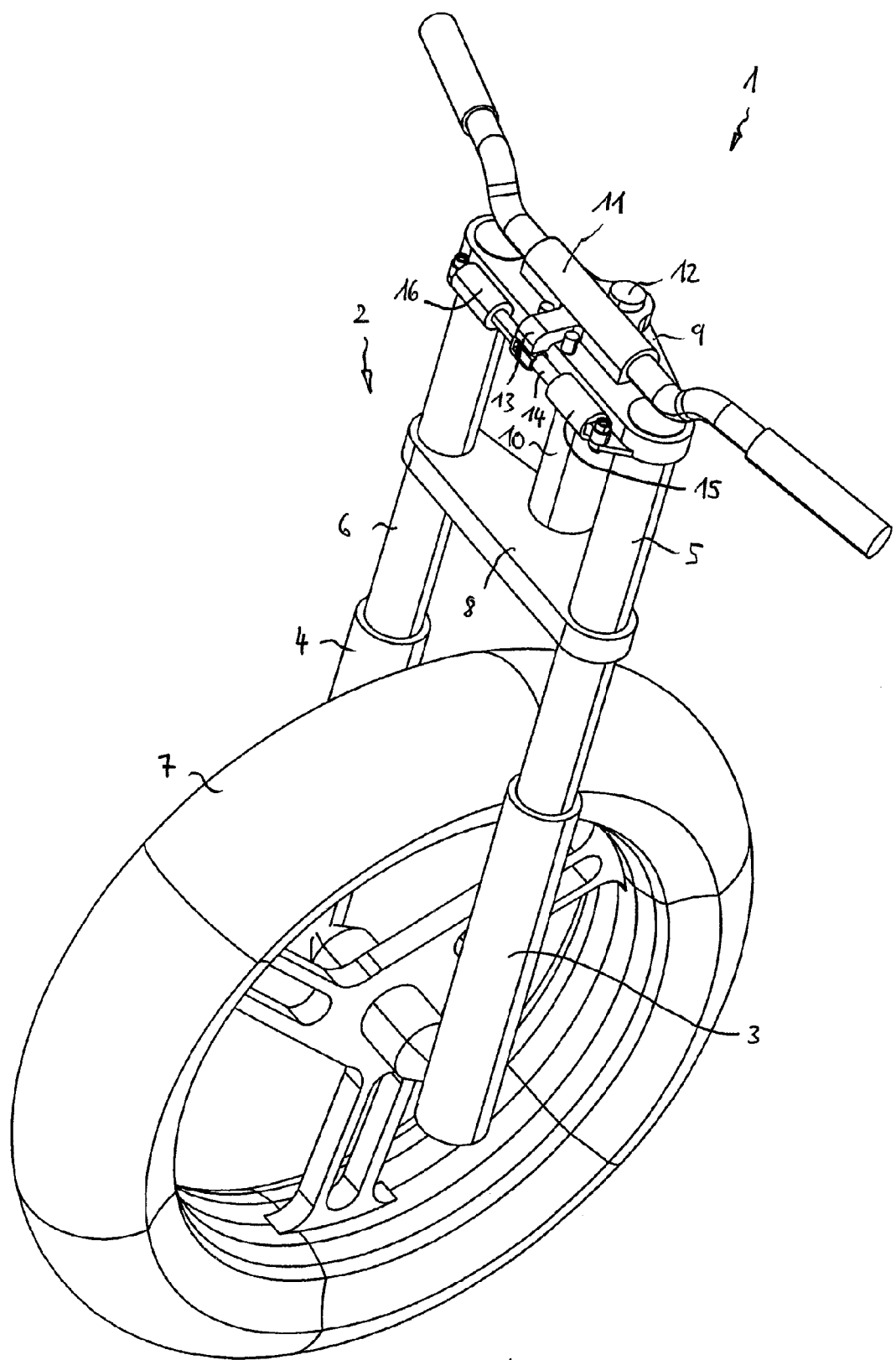
FIG. 1 shows a perspective illustration of a wheel carrier according to an embodiment the invention.

FIG. 1 shows a front wheel suspension 1 of a motorcycle, not illustrated here in greater detail, having a telescopic fork 2 comprising a left and a right fork rod. The two fork rods each have a lower fork tube 3, 4 and an upper fork tube 5, 6 which is displaceable relative to the lower fork tube. A front wheel 7 is supported at the lower ends of the two lower fork tubes 3, 4. The two upper fork tubes 5, 6 are joined together by a lower fork bridge 8 and an upper fork bridge 9. In this case, the two upper fork tubes 8, 9 are joined together by a so-called "control tube" 10. As a whole, the telescopic fork 2 may be pivotably supported, via the upper fork bridge 9 and/or via the lower fork bridge 8 and/or via the control tube, on a frame of the motorcycle, not further illustrated.

In principle, the telescopic fork 2 may also be supported on the frame or on the engine housing of the motorcycle via a longitudinal control rod. The manner in which the fork is supported on the remainder of the motorcycle is of secondary importance for the invention.

As shown in FIG. 1, a handlebar 11 is mounted at the upper fork bridge 9. The handlebar 11 is connected to the upper fork bridge 9 via a swivel bearing 12. The handlebar 11 may also be pivoted relative to the upper fork bridge 9 or the telescopic fork 2.

In the exemplary embodiment shown here, the handlebar 11 has a forwardly extending arm 13 which is connected to a piston rod 14. A piston, not further illustrated, is provided on the respective left and right end of the piston rod 14. The two pistons are displaceable in associated cylinders 15, 16. The system formed by the piston rod 14, the pistons, and the cylinders 15, 16 functions as an actuator by means of which the telescopic fork 2 may be pivoted relative to the handlebar 11. The actuator is controlled by an electronics system, not further illustrated. The electronics system monitors various driving state signals, such as wheel speed signals, yaw rate, inclination angle, etc. When the monitored driving state signals indicate the presence of a critical driving situation, a steering intervention may be performed by the actuator; i.e.; the telescopic fork 2 may be pivoted relative to the steering position specified by the driver in order to stabilize the driving state of the motorcycle.

Figure 2:
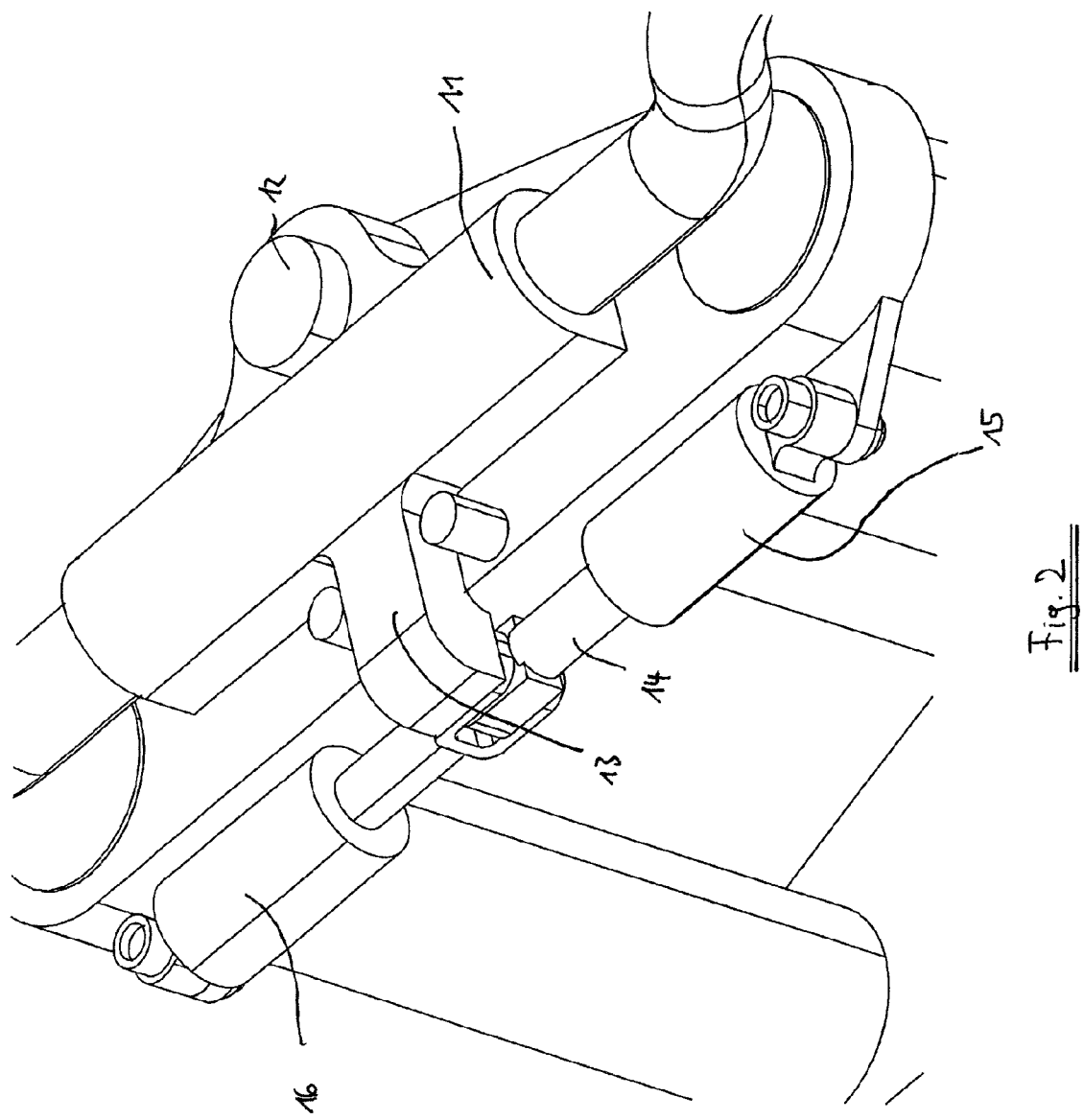
FIG. 2 shows an enlarged illustration of the wheel carrier of FIG. 1 in the region of the upper fork bridge.

FIG. 2 shows an enlarged illustration of the front wheel suspension in the region of the actuator and the handlebar 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motorcycle, comprising:
   a wheel carrier
   a front wheel carried by the wheel carrier;
   a handlebar; and
   a transmission unit, the transmission unit coupling the handlebar to the wheel carrier and transmitting steering forces introduced into the handlebar to the wheel carrier,
   wherein
      the transmission unit is arranged to permit the wheel carrier to move in a steering direction relative to the handlebar, and
      the transmission unit couples the handlebar to the wheel carrier such that when an actuator of the transmission unit is operated the wheel carrier moves in a steering direction relative to the handlebar and when the actuator is not operated the handlebar moves with the wheel carrier.

2. The motorcycle according to claim 1, wherein the transmission unit has an actuator arranged to pivot the wheel carrier relative respect to the handlebar.

3. The motorcycle according to claim 2, further comprising:
   an electronics system,
   wherein
      the electronics system monitors at least one driving state variable of the motorcycle, and
      when the electronics system determines based on the monitored at least one driving state variable that a critical driving state exists, the electronics system controls the actuator to perform a steering intervention to stabilize the driving state.

4. The motorcycle according to claim 3, wherein
   the wheel carrier has a left and a right fork arm which are joined together at the region of their upper ends by an upper fork bridge,
   the handlebar is mounted so as to be pivotable with respect to the upper fork bridge, and
   the actuator kinematically couples the handlebar to the wheel carrier.

5. The motorcycle according to claim 4, wherein the handlebar is supported directly on the fork bridge.

6. The motorcycle according to claim 3, wherein
   the wheel carrier is a telescopic fork comprising a left and a right fork rod,
   each fork rod is formed by an upper and a lower fork tube, and
   a fork bridge connects the two upper fork tubes to one another,
   the handlebar is mounted so as to be pivotable with respect to the fork bridge, and
   the actuator kinematically couples the handlebar to the wheel carrier.

7. The motorcycle according to claim 4, wherein the wheel carrier having the left and the right fork arm is a cast part.

8. The motorcycle according to claim 4, wherein the wheel carrier is pivotably suspended on a frame or on an engine housing of the motorcycle via at least one longitudinal control rod.

9. The motorcycle according to claim 4, wherein the actuator is a high-speed, precision motion actuator.

10. The motorcycle according to claim 9, wherein the actuator is at least one of a hydraulic cylinder, a pneumatic cylinder and an electrically-activated actuator.

* * * * *